United States Patent
Hayashida et al.

[11] Patent Number: 5,979,069
[45] Date of Patent: Nov. 9, 1999

[54] DIAL GAUGE

[75] Inventors: Shuuji Hayashida; Shigeru Ohshima; Seigo Takahashi; Masamichi Suzuki, all of Kawasaki, Japan

[73] Assignee: Mitutoyo Corporation, Kawasaki, Japan

[21] Appl. No.: 08/934,592

[22] Filed: Sep. 22, 1997

[30] Foreign Application Priority Data

Sep. 26, 1996 [JP] Japan .................................. 8-254575

[51] Int. Cl.⁶ .................................................. G01B 3/22
[52] U.S. Cl. .................... 33/556; 33/832; 33/706
[58] Field of Search ............................ 33/556, 558, 559, 33/561, 706, 708, 832; 341/15; 324/658, 662, 686, 690

[56] References Cited

U.S. PATENT DOCUMENTS

| | | | |
|---|---|---|---|
| 2,799,941 | 7/1957 | Emery | 33/559 |
| 3,370,478 | 2/1968 | Martin | 74/395 |
| 3,721,010 | 3/1973 | Ristow | 33/556 |
| 3,723,866 | 3/1973 | Michaud et al. | 324/686 |
| 3,816,929 | 6/1974 | Kiffe et al. | 33/556 |
| 4,075,763 | 2/1978 | Yamaryo | 33/559 |
| 4,114,280 | 9/1978 | Rucinski | 33/561 |
| 4,142,295 | 3/1979 | Nishina et al. | 33/558 |
| 4,489,496 | 12/1984 | Mizuno | 33/558 |
| 4,505,042 | 3/1985 | Nishina | 33/558 |
| 4,527,336 | 7/1985 | Mizuno et al. | 33/556 |
| 4,528,755 | 7/1985 | Kanda et al. | 33/559 |
| 5,172,485 | 12/1992 | Gerhard et al. | 33/706 |
| 5,574,381 | 11/1996 | Andermo et al. | 324/690 |
| 5,682,682 | 11/1997 | Renfew et al. | 33/556 |

FOREIGN PATENT DOCUMENTS

3304050 A1   8/1983   Germany.

*Primary Examiner*—G. Bradley Bennett
*Attorney, Agent, or Firm*—Oliff & Berridge, PLC

[57] ABSTRACT

A dial gauge with a simplified structure and reductions in number of parts and production costs. In the dial gauge having a case 10 which is composed of a case body 11, a front case member 21 provided on the front of the case body 11, and a rear case member 31 provided on the rear of the case body 11, the case body 11 and the front case member 21 are combinedly formed by using plastic materials. The rear case member 31 includes a rear cover and a reinforcing plate covering the rear of the case body 11.

14 Claims, 8 Drawing Sheets

DIAL GAUGE

BACKGROUND OF THE INVENTION

1. Field of the Invention

This invention relates to a dial gauge, more specifically, a dial gauge intended for decrease of the number of parts and reduction of production costs.

2. Description of the Related Art

A conventional dial gauge includes a case that is composed of: a cylinderical case body supporting a movable spindle in the axial direction passing through the outer circumferential wall of the case body; a front case member provided on the front of the case body and having a digital indicator for indicating a moving displacement amount of the spindle; and a rear case member provided on the rear of the case body.

The three members composing the case are individually formed in advance. In assembling processes, the front case member and the rear case member are assembled onto the case body, resulting in the case.

In the conventional fabrication, the case is composed of three individual members of the case body, the front case member and the rear case member, thereby allowing the large number of parts and the complicated process of assembling. Waterproof and dust-proof structures are required to be formed between the case body and the front case member and between the case body and the rear case member. Therefore the elaborate structure leads to increase of production costs.

As a model of the dial gauges, a dial gauge with an electrostatic capacitance type encoder is known. More specifically, a first scale is formed in a case to support a movable spindle in the axial direction as a sensor for measuring a moving displacement amount of the spindle, and a second scale is formed in front of the spindle opposite of the first scale. Relative stroke of the first and second scales is measured by detecting a change in electrostatic capacitance between electrodes arranged in the first and second scales.

In the electrostatic capacitance type encoder, a uniform gap is formed between the first scale and the second scale. But the gap tends to be narrower by reason of, such as the requirement of great precision and saving of electric power for inputting and outputting signals.

In conventional processes for setting the gap, great precision and complication are required for components for holding the first scale and the second scale with the uniform gap, which is a factor in increase of production costs in commercialization.

In the known structure for setting the uniform gap between the first scale and the second scale, plural projections which each have the height corresponding with the gap are formed on one of mutually opposing surfaces of the scales. The scale, not having the projections, is forced toward the scale having the projections by a plate spring portion of a cantilever support structure. The projections formed on the scale are abutted onto the other scale so as to form the uniform gap between the first and second scales.

However, according to the above fabrication, means for forcing one scale toward the other scale are the plate spring portion of the cantilever support structure, so that the scale is forced toward the other scale in the inclined state. It leads into the difference of the touching pressures to the other scale at each projection. Therefore, when the scales are relatively moved, the gap is easily changed between the scales and the degrees of abrasion vary among the projections, with the result that the gap between the scales cannot be maintained at a uniform space for a long period of time.

It is an object of the present invention to provide a dial gauge with a simplified structure, a decrease in number of parts and reduced production costs to resolve the conventional disadvantages.

It is another object of the present invention to provide a dial gauge which a gap between scales is retained at a uniform space for a long period of time, in addition to the aforementioned object.

SUMMARY OF THE INVENTION

A dial gauge of the present invention, having a spindle and a case composed of a cylinderical case body in which the spindle is passed through the outer circumferential wall of the case body and is supported to move in the axial direction, a front case member provided on the front of the case body and having a digital indicator for indicating a moving displacement amount of the spindle, and a rear case member provided on the rear of the case body, wherein the moving displacement of the spindle is indicated on the digital indicator in directly readable numerals, it is characterized by combinedly forming the case body and the front case by using plastic materials.

According to the above fabrication, the case body and the front case member are combinedly formed by using plastic materials, so that the number of parts results being fewer and the number of assembling processes results being smaller as compared with a structure in which the case body, the front case member and the rear case member are individually formed. As waterproof and dust-proof structure is not needed to be formed between the case body and the front case member, the structure of the case is simplified. Thereby reducing production costs.

In the above fabrication, it is advisable that the rear case member is composed of a reinforcing plate spanning over the rear of the case body, and a rear cover covering the rear of the case body over the reinforcing plate.

Where the case body and the front case member are combinedly formed by using plastic materials, the rear of the case body which is not formed thereon with the front case member is opened. When the reinforcing plate spans over the rear of the case which is not formed thereon with the front case member, and the rear cover covers the rear of the case body over the reinforcing plate, strength of the circular edge of the opened rear is enhanced, thereby ensuring the straightness performance of the spindle.

It is desirable that at least one of the reinforcing plate and the rear cover is made of metal.

With the above fabrication, the strength of the circular edge of the opened rear of the case body can be further enhanced, therefore, the straightness performance of the spindle can be maintained with the higher precision.

It is advisable that the reinforcing plate has a guide portion controlling the rotation of the spindle and guiding the movement of the spindle in the axial direction, a spring engaging portion engaging a spring which forces the spindle in one direction of the axial directions, and a release arm which is turned by operation from the outside of the case body and makes the displacement of the spindle in the other direction of the axial directions as opposed to the spring.

According to the above fabrication, the guide portion is formed in the reinforcing plate in order to control the rotation of the spindle and guide the spindle to move in only the axial direction, so that extra means for controlling the rotation of the spindle may not be formed in the case body, hence simplified processes and assemblies. Moreover, the spring engaging portion engaging the spring which forces the spindle in a direction of the two axial directions and the release arm as well as the guide portion are formed in the reinforcing plate, so that the guide portion, the spring engaging portion and the release arm are simultaneously formed by only attaching the reinforcing plate to the case body, resulting in the easier assemblies.

It is advisable that the case body, formed to be combined with the front case member by using the plastic materials, is designed to embed a bearing member which supports one end of the spindle and a stem which has a bearing member supporting the other end of the spindle in the case body.

According to the above fabrication, in forming the case body, the bearing member which supports an end of the spindle and the stem which has the bearing member supporting the other end of the spindle are embedded into the case body, therefore the attachment of the bearing member and the stem to the case body is easy.

Another dial gauge according to the present invention, having: a spindle; a case composed of a cylinderical case body in which the spindle is passed through the outer circumferential wall of the case body and is supported to move in the axial direction, a front case member provided on the front of the case body and having a digital indicator for indicating a moving displacement amount of the spindle, and a rear case member provided on the rear of the case body; and an encoder which has a first scale provided in the case and a second scale provided in the case on the opposite side of a gap from the first scale, and which measures a relative stroke of the first and second scales from a change in electrostatic capacitance between electrodes arranged in the first and second scales, the dial gauge is characterized by including, in the case body and the front case being combinedly formed by using plastic materials, a parallel forcing means for forcing the second scale toward the first scale to maintain a virtually parallel state between the first and second scale; and a gap forming means, provided on any one of mutually opposing surfaces of the first and second scales, for maintain a uniform gap between the first scale and the second scale to abut to the other opposing surface of the first scale or the second scale.

According to the above fabrication, in addition to the aforementioned effects, such as the reductions in number of parts and processes and production costs, the following effects are promised.

The second scale is forced toward the first scale while paralleling the first scale, and abutted through the gap forming means to the first scale, so that the touching pressure between the first scale and the second scale can be uniform throughout the surfaces of the scales. Therefore, the gap between the scales is seldom changed through the relative stroke of both the scales, moreover, an unbalanced abrasion does not occur, thereby decreasing the degree of abrasion as a whole and maintaining the uniform gap between the scale for a long time.

In the above fabrication, it is advisable that the forcibly parallel means has a first plate spring portion forcing an end portion of a scale board having the second scale toward the first scale, and a second plate spring portion forcing the other end portion of the scale board toward the first scale.

With the above fabrication, the scale board can be forced toward the first scale while paralleling the first scale by reason of the two plate spring portions which forces each end portion of the scale board.

It is desirable that the forcibly parallel means has a pair of first plate spring portions located parallel to each other and along the axial direction of the spindle and supported at ends thereof by the spindle, a joint plate portion establishing a link between the other ends of the pair of first plate spring portions and supporting one end portion of the scale board having the second scale, and a second plate spring portion extended from the joint plate portion toward the other end portion of the scale board to abut to the other end portion of the scale board at the extremity thereof and forcing the other end portion of the scale board toward the first scale, the first and second plate spring portion and the joint plate portion being formed from a piece of bent plate spring.

With the above fabrication, the first and second plate spring portions and the joint plate portion are formed by bending a piece of a plate spring, resulting in the smaller numbers of parts and assembling processes. The end portion of the scale board is forced toward the first scale by the other ends of a pair of the first plate spring portions, and the other end portion of the scale board is forced toward the first scale by the extremity of the second plate spring portion. Therefore, the scale board (namely, the second scale) can be forced toward the first scale while paralleling the first scale.

And then, it is advisable that the gap forming means is a thin film which has an even thickness and electrical insulation and formed on any one of the mutually opposing surfaces of the first scale and the second scale, or a tape which has an even thickness and electrical insulation and adhered on any one of the mutually opposing surfaces of the first scale and the second scale.

With the above fabrication, the first scale or the second scale is connected through the whole surface of the thin film or the tape to the other scale, so that the deformation and abrasion of the thin film or the tape are evident to a small degree and the precision can be maintained for a long time.

DETAILED DESCRIPTION OF THE PREFERRED EMBODIMENT(S)

Figure 1:
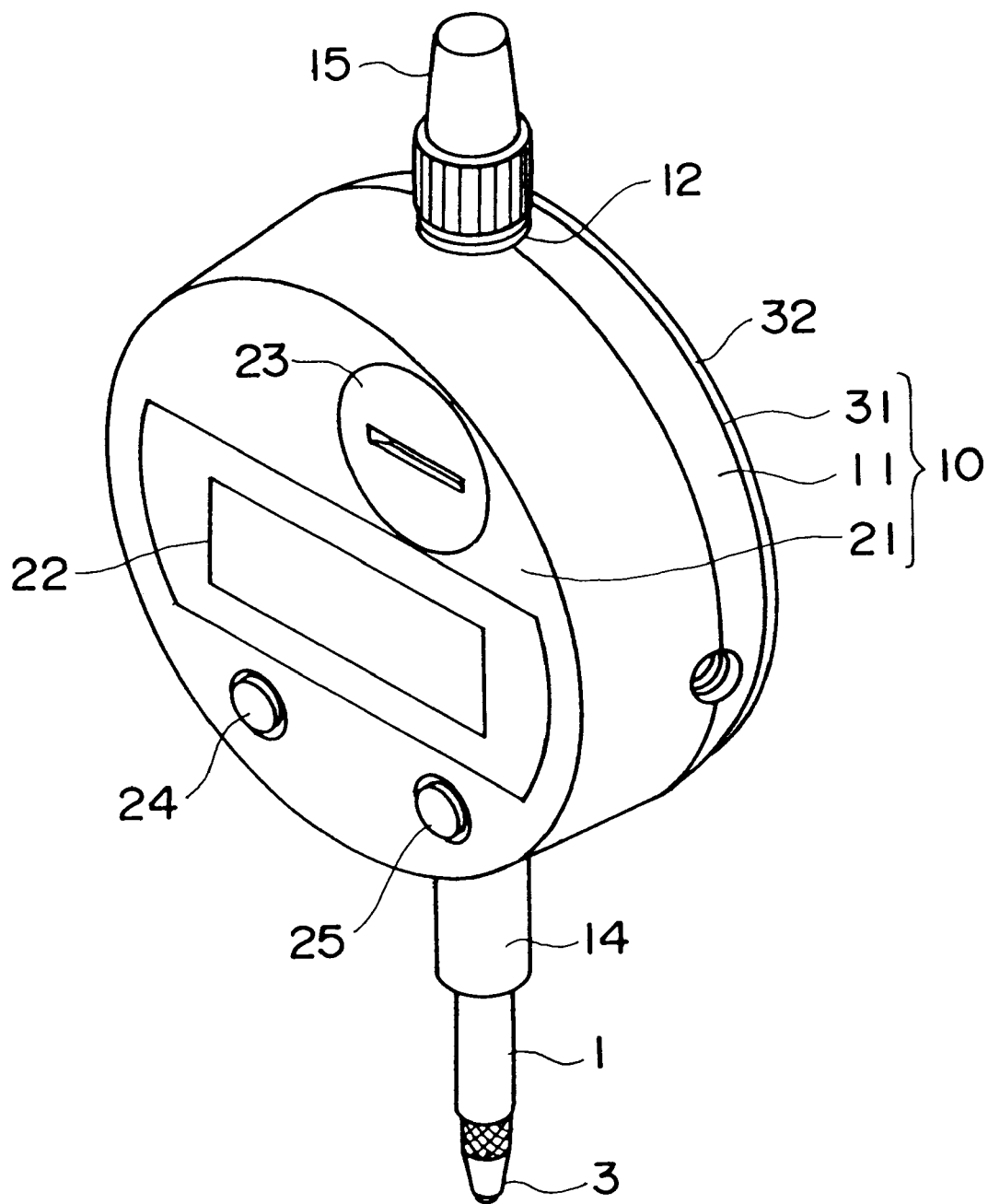
FIG. 1 is a perspective view showing appearance of the preferred embodiment according to the present invention.
Figure 2:
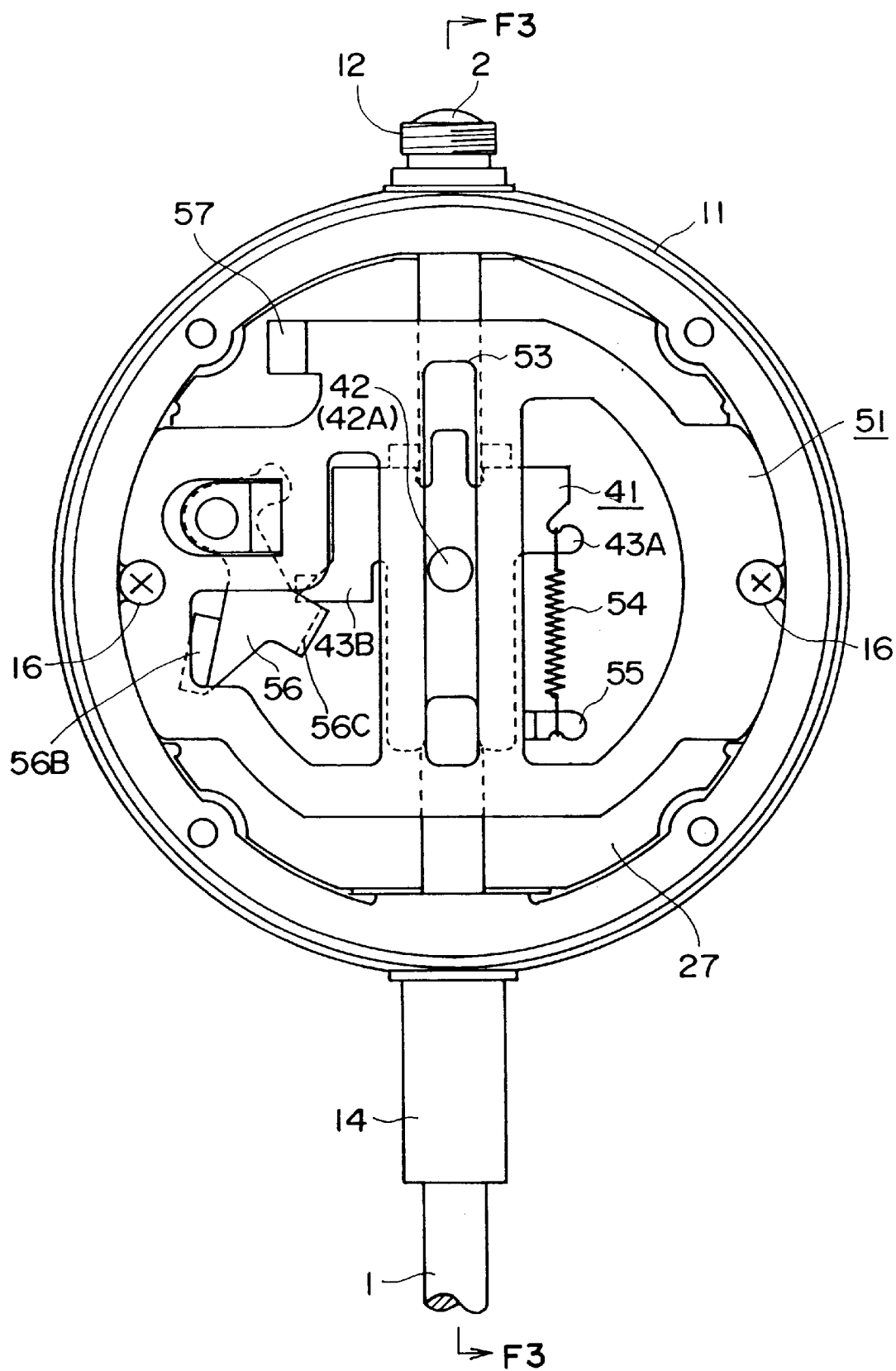
FIG. 2 is a back view of the embodiment when a rear cover is removed.
Figure 3:
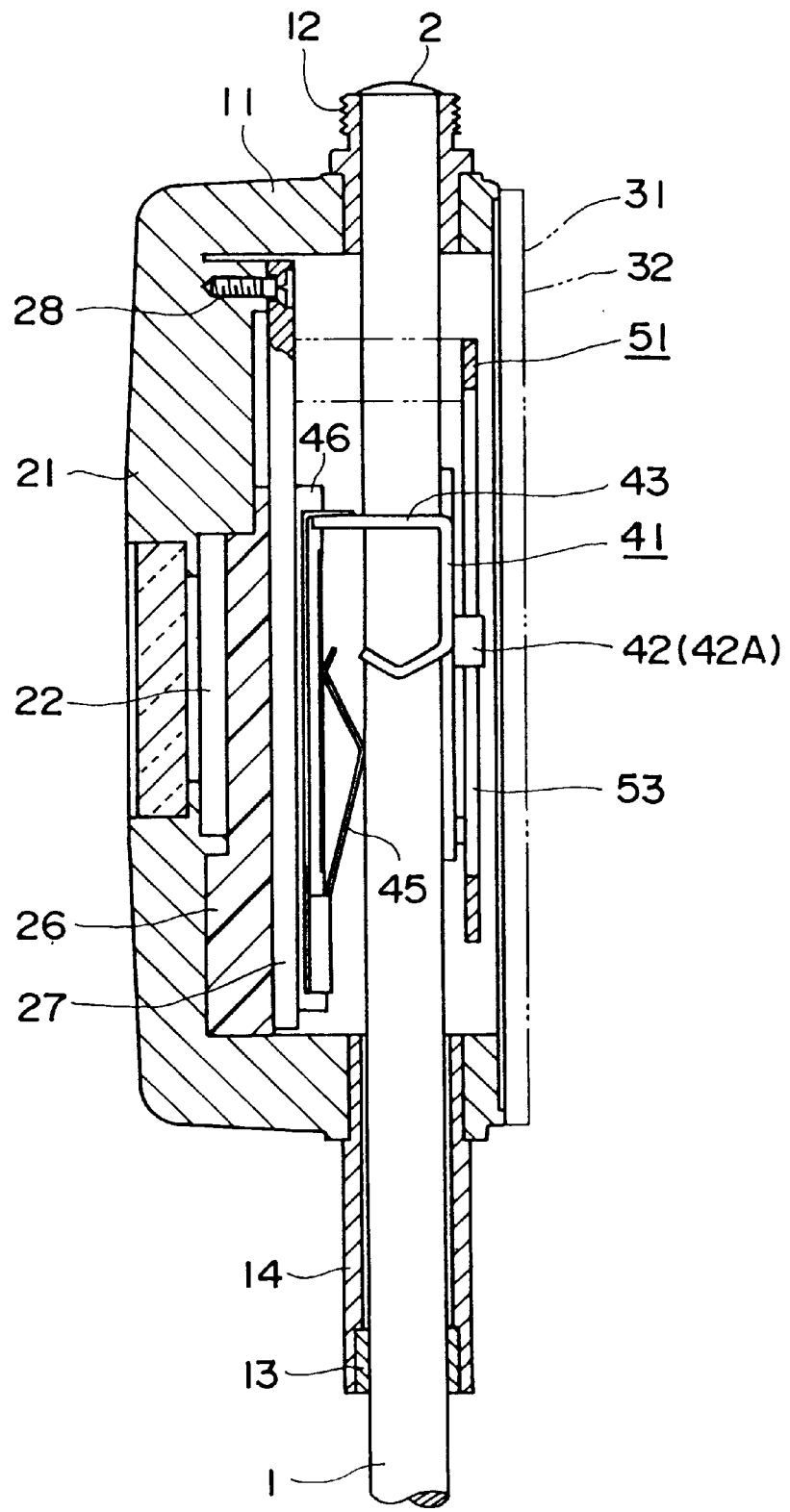
FIG. 3 is a sectional view taken along the F3—F3 line in FIG. 2.
Figure 4:
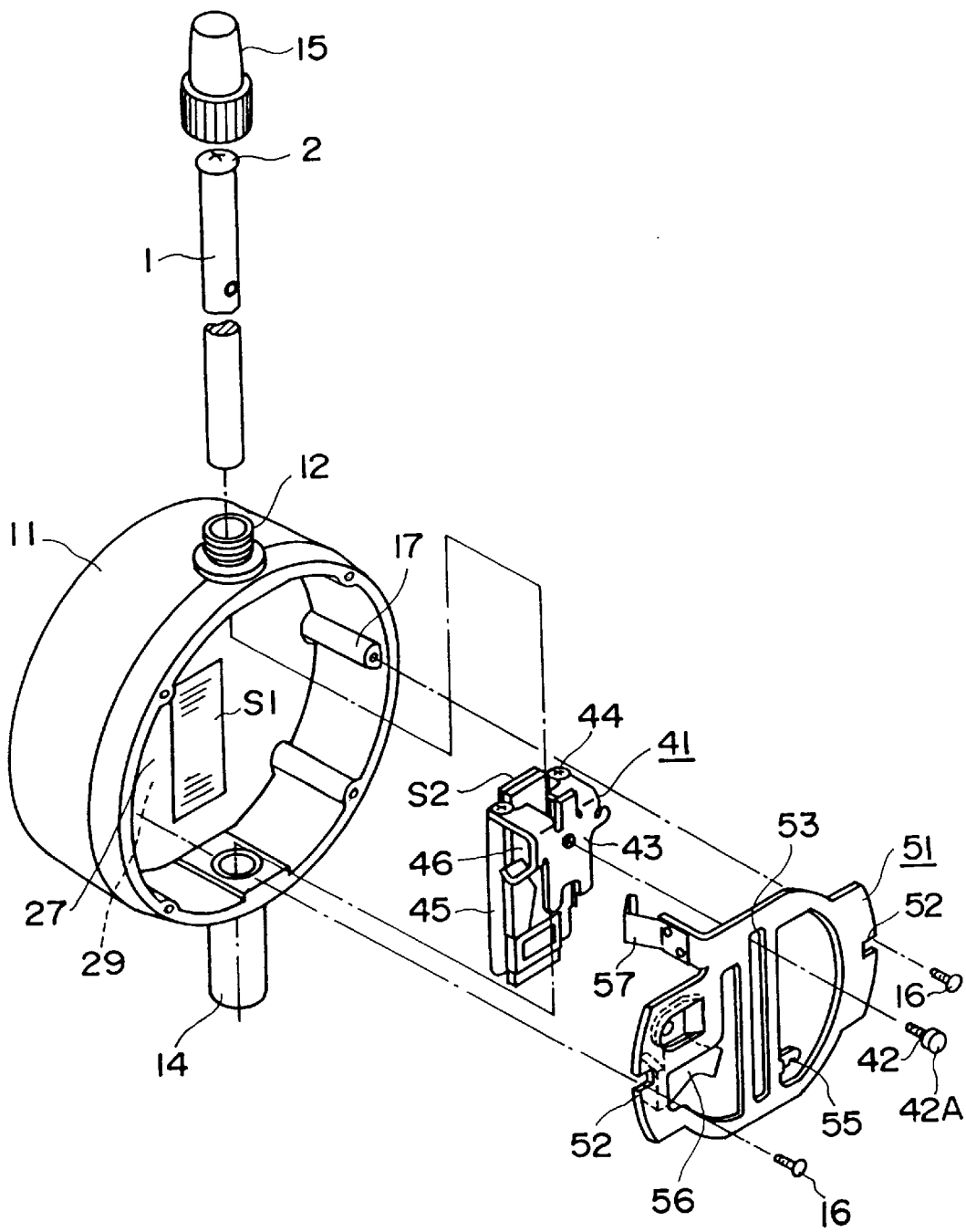
FIG. 4 is a perspectively exploded view of FIG. 2 and FIG. 3.

The preferred embodiment according to the present invention will be described hereinafter with reference to the attached drawings. FIG. 1 is a perspective view showing appearance of a dial gauge of the preferred embodiment. FIG. 2 is a back view of the dial gauge when a rear cover is removed. FIG. 3 is a sectional view taken along the F3—F3 line in FIG. 2. And FIG. 4 is a perspectively exploded view of FIG. 2 and FIG. 3 (the dial gauge when the rear cover is removed).

As shown in the above drawings, the dial gauge of the embodiment has a spindle 1 and a short cylinderical case 10. The case 10 includes a cylinderical case body 11 which supports the movable spindle 1 in the axial direction passing through the outer circumferential wall of the case body; a front case member 21 that is provided on the front of the case body 11; and a rear case member 31 that is provided on the rear of the case body 11.

The case body 11 and the front case member 21 are formed by using plastic materials, more specifically, are combinedly formed by injection molding of engineering plastics. The rear case member 31 is composed of a metal-made reinforcing plate 51 that spans over the rear of the case body 11, and a plastic-made (more definitely, engineering plastic-made) rear cover 32 that covers on the rear of the case body 11 over the reinforcing plate 51.

The spindle 1 has a stopper 2 at an end thereof (an upper end) and a measuring point 3, touching onto an object measured, at the other end thereof.

In the case body 11, a bearing member 12 which supports the end (the upper end portion) of the spindle 1 on the circumferential wall thereof, and a stem 14 which has a built-in bearing member 13 supporting the other end (the lower end portion) of the spindle 1 are combinedly embedded during the injection molding of the engineering plastics. A cap 15 covering the end of the spindle 1 is engaged onto the bearing member 12. Plural screwed tubes 17 are formed onto the inner circumferential wall of the case body 11 for attaching the reinforcing plate 15 with screws 16.

On the front surface of the front case member 21, a digital indicator 22, indicating a moving displacement amount of the spindle 1, is formed in a central area. A battery case 23 is formed above the digital indicator 22. A zero resetting switch 24 and a power ON/OFF switch 25 are formed below the digital indicator 22. On the inner front surface of the front case member 21, an electrical component board 27 is attached through a rubber sheet 26 with plural screws 28. On the electrical component board 27, a first scale S1 is formed along a moving direction of the spindle 1, and an electrostatic capacitance type encoder 29 is formed for indicating the moving displacement amount of the spindle 1 onto the digital indicator 22 in directly readable numerals by using a change in electrostatic capacitance between electrodes arranged on the first scale S1 and a second scale S2 which is formed to the spindle 1.

Figure 5:
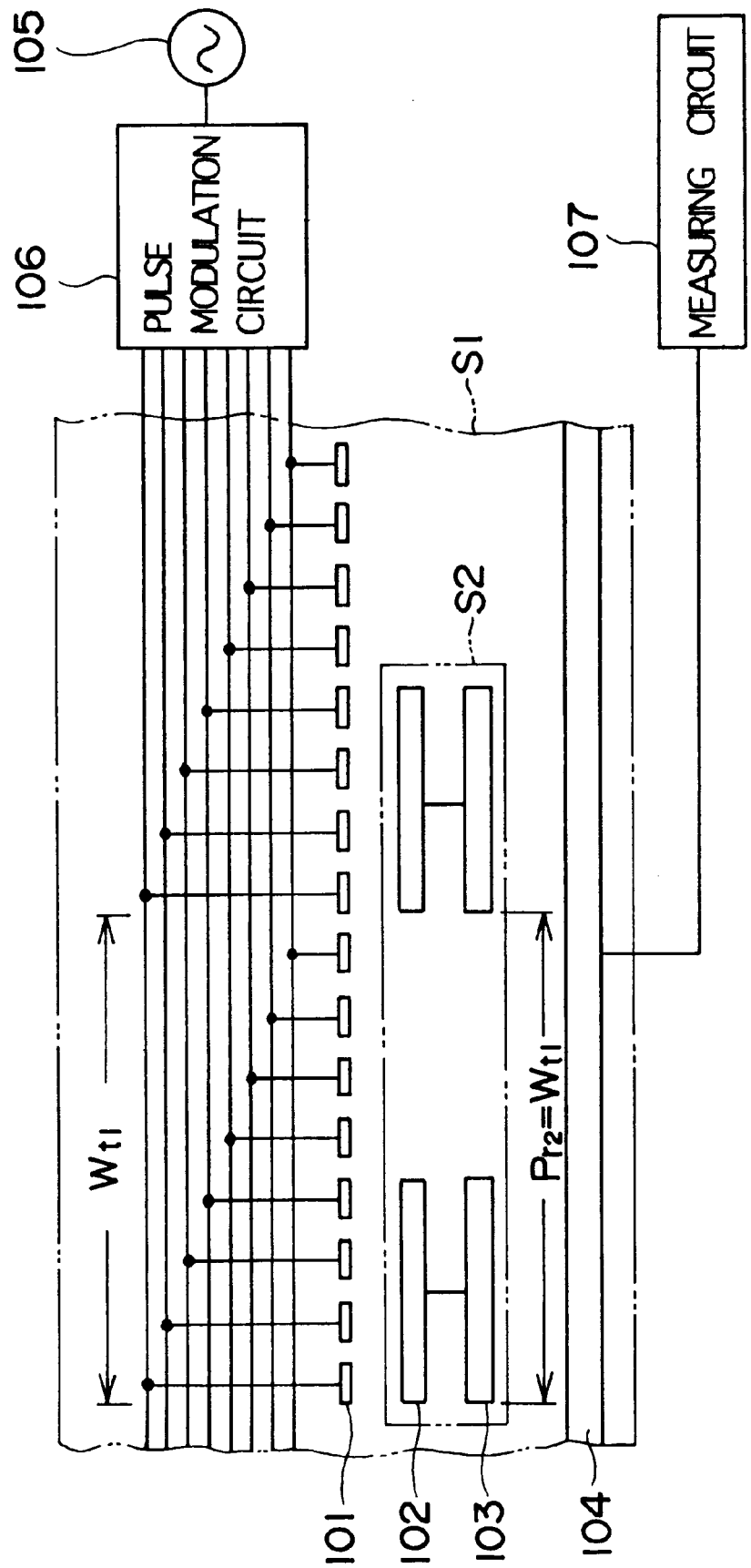
FIG. 5 is a diagram showing an electrostatic capacitance type encoder in the embodiment.

A design of the electrostatic capacitance type encoder 29 will be explained hereinafter with reference to FIG. 5. On the first scale S1, plural first transmitting electrodes 101 are aligned along the moving direction of the spindle at fixed intervals, and a first receiving electrode 104 is formed along the aligning direction of the first transmitting electrode 101. In this example, an electrode unit of the transmitting electrode 101 is formed from eight electrodes. A pulse modulation circuit 106 generates a sine wave, which is pulsed based on a clockpulse from an oscillator 105 and has eight phases being out of phase angle with each other by 45 degrees. The generated sine wave is supplied to the first transmitting electrode 101. In other words, a pitch of a unit of the first transmitting electrode 101 results in a transmitting wavelength pitch Wt1.

On the second scale S2, a second receiving electrode 102, which is faced to and connected for capacitance with the four transmitting electrode 101 on the first scale S1, is aligned in a pitch Pr2 equal to the transmitting wavelength pitch Wt1. And also, a second transmitting electrode 103 is aligned on the second scale S2 to electrically connect with the second receiving electrode 102 and to connect for capacitance with the first receiving electrode 104 on the first scale S1. The first receiving electrode 104 on the first scale S1 is connected to a measuring circuit 107.

Accordingly, when a relative stroke is performed between the first scale S1 and the second scale S2, a phase of a receiving signal which is caused by a capacitive connection between the first transmitting electrode 101 and the second receiving electrode 102 with the relative stroke is detected, thereby the relative displacement amount of the first scale S1 and the second scale S2 can be measured. In this case, the first transmitting electrode 101 is separated into eight electrodes and driven at a phase angle shifted 45 degrees from each other, resulting in the position measurement with the precision that the pitch Pr2 of the second receiving electrode 102 is divided into eight.

Figure 6:
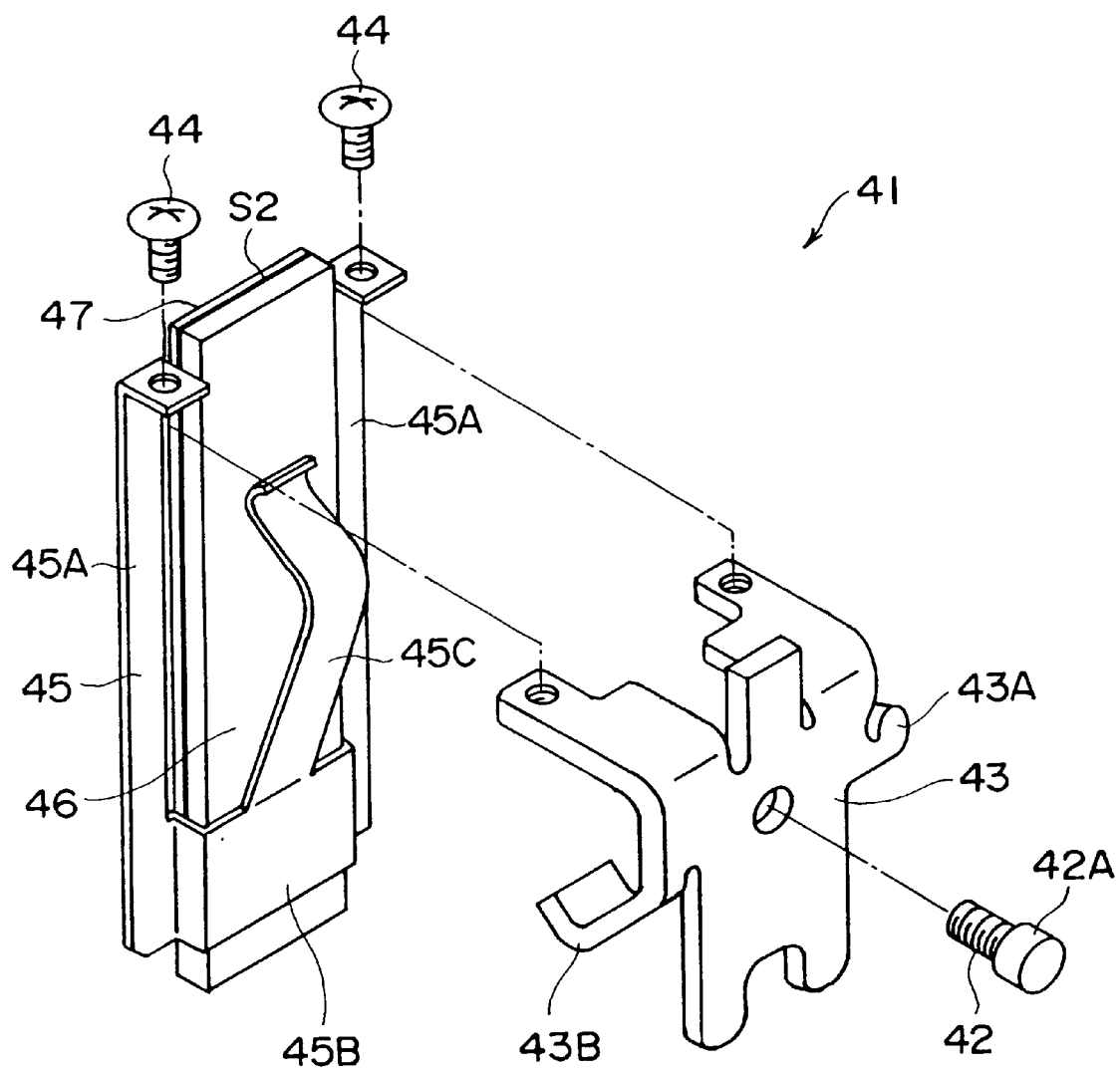
FIG. 6 is a perspectively exploded view showing a parallel forcing means in the embodiment.

The second scale S2 is attached to the spindle 1 inside the case 10 through a parallel forcing means 41. As shown in FIG. 6, the parallel forcing means 41 is composed of: an attachment 43 screwed to the spindle 1 with a screw 42; a parallel displacement spring 45 formed from a plate spring which is screwed to ends of the attachment 43 with screws 44; and a scale board 46 which is displaced toward the first scale S1 to maintain an almost parallel state to the first scale S1 by the parallel displacement spring 45 and which has the second scale S2 on the face opposite the first scale S1.

In turn, the attachment 43 has a spring engaging portion 43A at a side thereon and a curving portion 43B at the other end thereon.

The parallel displacement spring 45 is composed of: a pair of first plate spring portions 45A which is screwed to the attachment 43 with the screw 44 at ends (the top ends in the drawing) thereof; a joint plate portion 45B which establishes a link between the other ends (the bottom ends in the drawing) of the pair of the plate spring portions 45A and supports and an end portion (the lower end portion in the drawing) of the scale board 46 having the second scale; and a second plate spring portion 45C which is bent to slope up gradually from a middle area of the joint plate portion 45B (between the pair of the first plate spring portions 45) toward a direction away from the pair of the first spring portions 45A, and is bent back toward the pair of the first spring portions 45A to be abutted to the other end portion (the upper end portion in the drawing) of the scale board 46, and then is bent ending in an arc to the direction away from the scale board 46 again. When the spindle 1 is not inserted yet, a space between the second plate spring portion 45C and the attachment 43 is defined as a smaller size than the diameter of the spindle 1.

Figure 7:
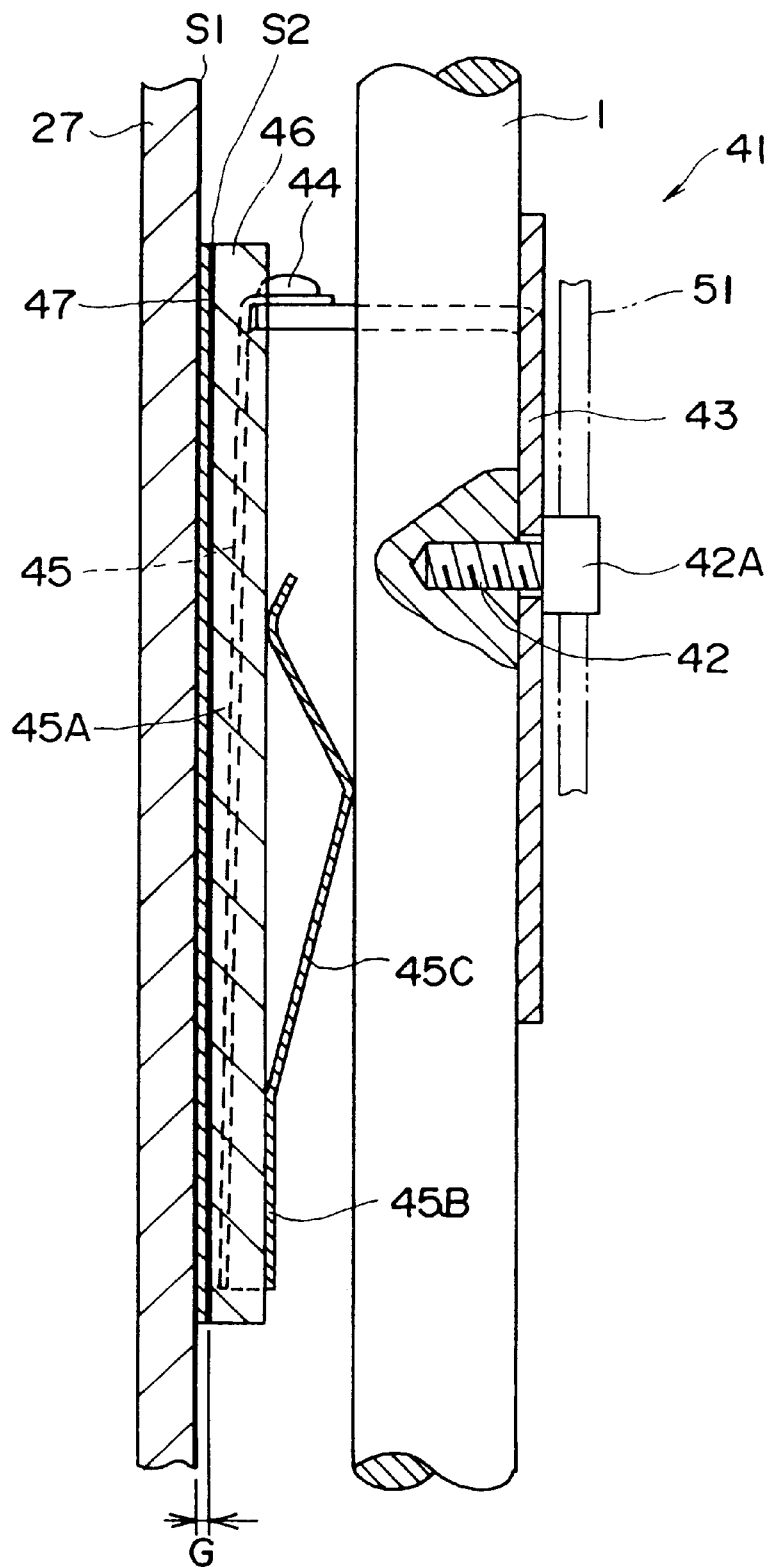
FIG. 7 is a sectional view showing states of a first scale and a second scale under an operation of the parallel forcing means in the embodiment.

As shown in FIG. 7, therefore, the spindle 1 is inserted between the second plate spring portion 45C and the attachment 43 and the attachment 43 is screwed to the spindle 1 with the screw 42. The space between the second plate spring portion 45C and the attachment 43 is smaller than the diameter of the spindle 1, so that the parallel displacement spring 45 is forced toward the first scale S1 through the second plate spring portion 45C. Thereupon the end portion (the lower end portion in the drawing) of the scale board 46 is forced toward the first scale S1 by the other end portion (the bottom end portion in the drawing) of the first plate spring portion 45A. And, the other end portion of the scale board 46 is forced toward the first scale S1 by the extremity portion of the second plate spring portion 45C, with the result that the scale board 46 is forced toward the first scale S1 while paralleling the first scale S1. In other words, the second scale S2 is forced toward and abutted to the first scale S1 while paralleling the first scale S1.

In this point, a thin film 47 having an even thickness is formed on the surface of the second scale S2 as a gap forming means for maintaining a uniform gap G between the first and second scales S1 and S2 by abutting onto the first scale S1. As the thin film 47, materials having superior abrasion resistance, slidingness and electrical insulation, such as a polyester tape (trade name: POLYESTER TAPE No.3965 made by SUMITOMO 3M CO. LTD.) is adhered on the surface of the second scale S2. As a result, the gap G between the first scale S1 and the second scale S2 is set at a uniform space (the thickness of the thin film 47).

Figure 8:
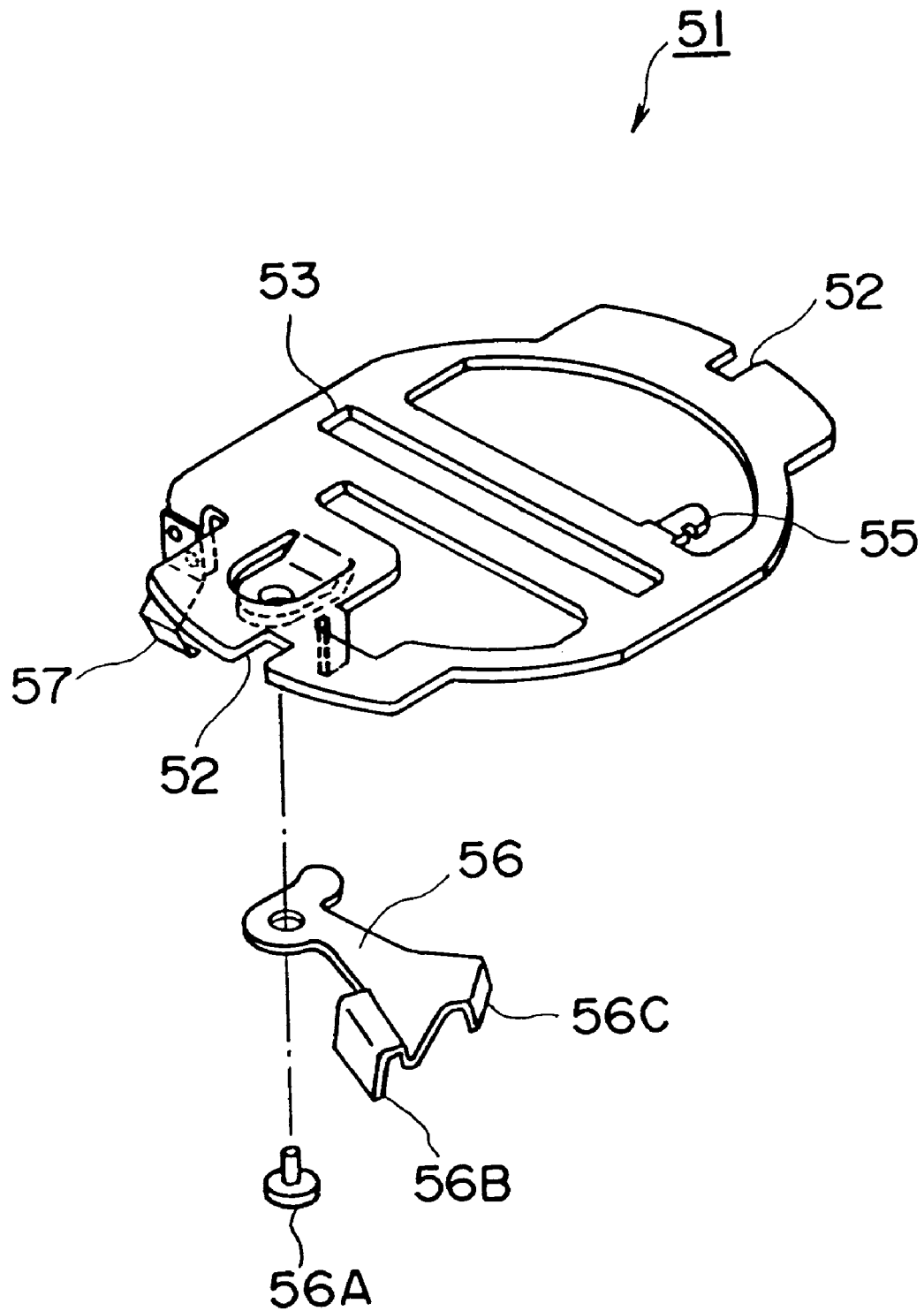
FIG. 8 is a perspective view showing a reinforcing plate on the embodiment.

As shown in FIG. 8, on both sides of the reinforcing plate 51, recesses 52 for threading the screws 16 are formed. In the reinforcing plate 51, a guide hole 53 is formed as a guiding portion for limiting the rotation of the guiding the spindle 1 and movably guiding the spindle 1 to only the axial direction. And a spring engaging portion 55, as a spring engaging element for engaging a spring 54 which forces the spindle 1 in one direction of the axial directions (the down direction in FIG. 2), a release arm 56 and a plate ground 57 are formed.

The guide hole 53 is formed to be an elongated oval shape along the moving direction of the spindle 1, in which a screw-head 42A of the screw 42 is slidably caught in the guide hole 53. The release arm 56 is rotatably supported on the reinforcing plate 51 with a pin 56A. On one of free ends of the release arm 56, an abutting portion 56B is formed to abut to a release pin (not shown) which is inserted from the outside of the case 10, and to cause the release arm 56 to pivot about the pin 56A. And on the other free end of the release arm 56, an engagement 56C is formed to engage with the curving portion 43B when the release arm 56 pivots, and to move the attachment 43 and the spindle 1 in an upper direction of FIG. 2 as opposed to the forcing power of the spring 54. The plate ground 57 is made from a conductive material and contacted to the electrical component board 27 at the extremity thereof.

In the fabrication specified above, the assembling process is carried out through the following steps. As shown in FIG. 4, after the electrical component board 27 is incorporated into the case body 11 and the front case member 21, which are incorporated with the digital indicator 22 in advance, and is screwed to the front case member 21 with the screw 28, the parallel forcing means 41 is placed on the electrical component board 27. At this time, the parallel displacement spring 45 of the parallel forcing means 41 is not deformed, so that the parallel forcing means 41 is placed in a horizontal position not to incline to the electrical component board 27. During the above state, after the spindle 1 is inserted through the bearing member 12 between the second plate spring portion 45C and the attachment 43 of the parallel forcing means 41, the attachment 43 is screwed to the spindle 1 with the screw 42.

Here, the space between the second plate spring portion 45C and the attachment 43 is formed to be smaller than the diameter of the spindle 1, so that the parallel displacement spring 45 is forced through the second plate sprig portion 45C toward the first scale S1. Thereupon the end portion of the scale board 46 is forced toward the first scale S1 by the other end portion (the bottom end portion in FIG. 7) of the first plate spring 45A, and the other end portion (the upper end portion in FIG. 7) of the scale board 46 is also forced toward the first scale S1 by the extremity of the second plate spring portion 45C, with the result that the scale board 46 is forced toward and abutted onto the first scale S1 while paralleling the first scale S1. In this state, the thin film 47 is formed on the surface of the second scale S2, so that the gap G between the first scale S1 and the second scale S2 is ensured to be a uniform space (the thickness of the thin film 47).

Next, the reinforcing plate 51 spans over the case body 11 and screwed at the screwed tubes 17 with the screws 16. Thereupon the extremity of the plate ground 57 is contacted to the electrical component board 27, and the screw-head 42A of the screw 42 is caught in the guide hole 53. As a result, the spindle 1 is allowed to move in only the axial direction in the not-rotated state, so that the first scale S1 and the second scale S2 are relatively stroked in the mutually facing state. Finally, the rear cover 32 is covered on the rear of the case body 11.

According to the embodiment, the case body 11 and the front case member 21 is combinedly formed by injection molding of engineering plastics, so that the number of parts can be fewer than that of the case 10 which is composed of independent members of the case body 11, the front case member 21 and the rear case member 31. Consequently, the number of the assembling processes is fewer, resulting in a reduction of production costs.

When the case body 11 and the front case member 21 are formed, the bearing member 12 supporting one of the ends of the spindle 1 and the stem 14 which has the bearing member 13 supporting the other end of the spindle 1 are embedded, hence the easier attachment of the bearing member 12 and the stem 14 for the case body 11.

From a reason of the use of engineering plastics as plastic materials, the case body 11 and the front case member 21 have the high strength, therefore the straightness performance of the spindle 1 can be ensured. In addition, the reinforcing plate spans over the back opening of the case body 11 and the rear cover 32 is covered from the outside, so that strength of the whole case 10 can be increased. As an additional plus, the reinforcing plate 51 is made of metal, so that the strength of the side opening of the case body 11 is further increased, thereby maintaining the straightness performance of the spindle 1 with a higher precision.

The reinforcing plate 51 has the guide hole 53 which limits the rotation of the spindle 1 and guides the spindle 1 in only the axial direction of the spindle 1, the spring engaging portion 55 which engages the spring 54 forcing the spindle 1 in one of the two axial directions, the release arm 56, and the plate ground 57. Therefore, the guide hole 53, the spring engaging portion 55, the release arm 56 and the plate ground 57 can be attached to case body 11 by attaching only the reinforcing plate 51, resulting in a simple assembly.

The first scale S1 is formed on the electrical component board 27 and the second scale S2 is formed through the parallel forcing means 41 to the spindle 1, so that the second scale S2 is forced toward the first scale S1 while paralleling the first scale S1 by the parallel forcing means 41. Accordingly, the second scale S2 is not inclined to the first scale S1, with the result that the uniform gap G between the first and second scales S1 and S2 is maintained for a long period of time.

The parallel forcing means 41 is formed from a piece of the bent plate spring having a pair of the first plate sprig portions 45A which is supported at the end thereof by the spindle 1, the joint plate portion 45B which establishes a link between the other ends of the pair of first plate spring portions 45A and supports an end portion of the scale board 46, and the second plate spring portion 45C which is extended from the joint plate portion 45B toward the other end portion of the scale board 46 to abut to the other end portion of the scale board 46 at the extremity thereof and forces the other end portion of the scale board 46 toward the first scale S1, hence the smaller number of parts and decrease of the assembling processes.

The thin film 47 having an even thickness and electrical insulation is formed on the surface of the second scale S2. It is naturally resulted to abut the second scale S2 through the thin film 47 to the first scale S1 when the second scale S2 is forced toward the first scale S1, so that the gap G between the first scale S1 and the second scale S2 can be defined as a uniform space (the thickness of the thin film 47). Moreover, the first scale S1 contacts onto the whole surface of the thin film 47, so that the deformation and abrasion of the thin film 47 is evident to a small degree and the high precision can be maintained for a long time.

Especially, the polyester tape, having superior abrasion resistance, slidingness and electrical insulation, as the thin film 47 is adhered onto the surface of the second scale S2, therefore the gap G between the first and second scales S1 and S2 can be smoothly formed.

In the assembling processes, after the electrical component board 27 is incorporated in and screwed to the front case member 21 and the case body 11 which are combinedly formed, the parallel forcing means 41 is placed on the electrical component board 27. After that, the spindle 1 which is threaded from the bearing portion 12 is inserted between the attachment 43 and the second plate spring portion 45C of the parallel forcing means 41 and screwed to the attachment 43. Next, the reinforcing plate 51 is placed in and screwed to the rear circular edge of case body 11, and then the rear cover 32 is covered. In a word, the assembly is easy because assemblies which plural parts are incorporated therein in advance are only assembled in order.

In the embodiment specified above, the rear case member 31 is composed of the metal-made reinforcing plate 51 and the rear cover 32 made of plastic (engineering plastics), but the reinforcing plate 51 can be made of plastic (engineering plastics) and the rear cover 32 is made of metal. Alternatively, the rear case member 31 may be composed of any one of the reinforcing plate 51 and the rear cover 32.

The parallel forcing means 41 is formed by bending a piece of a plate spring in the above embodiment, but it can be formed from two pieces of the plate spring. The use of the plate spring is not limited, and the parallel forcing means 41 may be composed of elastic bodies, such as plural coils and rubber.

The gap forming means is a tape (the thin film 47) adhered on the surface of the second scale S2 in the above embodiment, but it can be composed of plural projections. A case for attaching the gap forming means is not limited to the second scale S2, and may be the first scale S1.

The above embodiment is designed to detect the moving displacement amount of the spindle 1 by using the electrostatic capacitance type encoder 29, but another type encoder, such as an optoelectronic type encoder and an electromagnetic type encoder, can be used instead of the electrostatic capacitance type encoder 29.

According to the dial gauge of the present invention, the case body and the front case member are combinedly formed by using plastic materials, resulting in a simple structure and reductions of the number of parts and production costs.

The parallel forcing means which forces the second scale S2 toward the first scale S1 while the second scale S2 is virtually paralleling the first scale S1, and the gap forming means which maintains a gap between the first and second scales S1 and S2 by abutting any one of the opposite surfaces of the first scale S1 and the second scale S2 onto an opposite surface of the first scale S1 or the second scale S2 are provided. Thereby allowing the second scale S2 to be forced toward the first scale S1 to maintain the parallel state to the first scale S1 and to be abutted through the gap forming means to the second scale S2, with the result that the gap between the scales can be maintained at the uniform space for a long time.

What is claimed is:

1. A dial gauge, having a spindle and a case comprising a cylindrical case body in which the spindle is passed through the outer circumferential wall of the case body and is supported to move in the axial direction, a front case member provided on the front of the case body and having a digital indicator for indicating a moving displacement amount of the spindle, and a rear case member provided on the rear of the case body, said rear case member comprising a reinforcing plate spanning over the rear of said case body between respective edges of an opening of said case body and a rear cover covering the rear of said case body over the reinforcing plate, wherein the moving displacement of the spindle is indicated on the digital indicator in directly readable numerals, said dial gauge produced by the following method:

combinedly forming the case body and the front case member into a single component by using plastic materials.

2. The dial gauge according to claim 1, wherein at least one of said reinforcing plate and said rear cover is made of metal.

3. The dial gauge according to claim 1, wherein said reinforcing plate has a guide portion controlling the rotation of the spindle and guiding the movement of the spindle in the axial direction.

4. The dial gauge according to claim 1, wherein said reinforcing plate has a guide portion controlling the rotation of the spindle and guiding the movement of the spindle in the axial direction, a spring engaging portion engaging a spring which forces the spindle in one direction of the axial directions, and a release arm which is turned by operation from the outside of said case body and makes the displacement of the spindle in the other direction of the axial directions as opposed to the spring.

5. The dial gauge according to claim 1, wherein said case body, formed to be combined with said front case member by using the plastic materials, is designed to embed a bearing member which supports one end of the spindle and a stem which has a bearing member supporting the other end of the spindle in said case body.

6. A dial gauge having a spindle, a case comprising a cylindrical case body in which the spindle is passed through the outer circumferential wall of the case body and is supported to move in the axial direction, a front case member provided on the front of the case body and having a digital indicator for indicating a moving displacement amount of the spindle, and a rear case member provided on the rear of the case body, said rear case member comprising a reinforcing plate spanning over the rear of said case body between respective edges of an opening of said case body and a rear cover covering the rear of said case body over the reinforcing plate, and an encoder which has a first scale provided in the case and a second scale provided in the case on the opposite side of a gap from the first scale and which measures a relative stroke of the first and second scales from a change in electrostatic capacitance between electrodes arranged in the first and second scales, said dial gauge comprising:

- a single component constructed by combinedly forming said case body and said front case member using plastic materials;
- a parallel forcing means for forcing the second scale toward the first scale to maintain a virtually parallel state between the first and second scale; and
- a gap forming means, provided on any one of mutually opposing surfaces of the first and second scales, for maintain a uniform gap between the first scale and the second scale to abut to the other opposing surface of the first scale or the second scale.

7. The dial gauge according to claim 6, wherein said forcibly parallel means has a first plate spring portion forcing an end portion of a scale board having the second scale toward the first scale, and a second plate spring portion forcing the other end portion of the scale board toward the first scale.

8. The dial gauge according to claim 6, wherein said forcibly parallel means has a pair of first plate spring portions located parallel to each other and along the axial direction of the spindle and supported at ends thereof by the spindle, a joint plate portion establishing a link between the other ends of the pair of first plate spring portions and supporting one end portion of the scale board having the second scale, and a second plate spring portion extended from the joint plate portion toward the other end portion of the scale board to abut to the other end portion of the scale board at the extremity thereof and forcing the other end portion of the scale board toward the first scale, the first and second plate spring portion and the joint plate portion being formed from a piece of bent plate spring.

9. The dial gauge according to claim 8, wherein said gap forming means is a thin film having an even thickness and electrical insulation and formed on any one of the mutually opposing surfaces of the first scale and the second scale.

10. The dial gauge according to claim 9, wherein said thin film is a tape having an even thickness and electrical insulation and adhered on any one of the mutually opposing surfaces of the first scale and the second scale.

11. The dial gauge according to claim 9, wherein said rear case member is composed of a reinforcing plate spanning over the rear of said case body, and a rear cover covering the rear of said case body over the reinforcing plate.

12. The dial gauge according to claim 11, wherein at least one of said reinforcing plate and said rear cover is made of metal.

13. The dial gauge according to claim 11, wherein said reinforcing plate has a guide portion controlling the rotation of the spindle and guiding the movement of the spindle in the axial direction.

14. The dial gauge according to claim 11, wherein said reinforcing plate has a guide portion controlling the rotation of the spindle and guiding the movement of the spindle in the axial direction, a spring engaging portion engaging a spring which forces the spindle in one direction of the axial directions, and a release arm which is turned by operation from the outside of said case body and makes the displacement of the spindle in the other direction of the axial directions as opposed to the spring.

* * * * *